(12) United States Patent
Hosseini et al.

(10) Patent No.: US 11,350,369 B2
(45) Date of Patent: May 31, 2022

(54) DYNAMIC UPLINK POWER CONTROL FOR MULTI-CONNECTIVITY TRANSMISSIONS BASED ON RESERVED POWER LEVEL ASSOCIATED WITH FIRST CELL GROUP

(71) Applicant: QUALCOMM Incorporated, San Diego, CA (US)

(72) Inventors: Seyedkianoush Hosseini, San Diego, CA (US); Peter Gaal, San Diego, CA (US); Xiao Feng Wang, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/831,615

(22) Filed: Mar. 26, 2020

(65) Prior Publication Data

US 2020/0314762 A1 Oct. 1, 2020

Related U.S. Application Data

(60) Provisional application No. 62/826,784, filed on Mar. 29, 2019.

(51) Int. Cl.
*H04W 52/14* (2009.01)
*H04W 52/32* (2009.01)
*H04W 72/10* (2009.01)
*H04W 72/04* (2009.01)

(52) U.S. Cl.
CPC ....... *H04W 52/146* (2013.01); *H04W 52/325* (2013.01); *H04W 72/0413* (2013.01); *H04W 72/10* (2013.01)

(58) Field of Classification Search
CPC . H04W 52/146; H04W 52/16; H04W 52/325; H04W 52/34; H04W 52/367; H04W 52/40; H04W 72/0413; H04W 72/10; H04W 76/15; H04L 5/0035; H04L 5/0044; H04L 5/0053; H04L 5/0064
See application file for complete search history.

(56) References Cited

U.S. PATENT DOCUMENTS

| 2016/0021653 A1* | 1/2016 | Papasakellariou .... H04L 5/0057 370/329 |
| 2016/0044606 A1* | 2/2016 | Yin ..................... H04W 52/146 455/450 |

OTHER PUBLICATIONS

International Search Report and Written Opinion—PCT/US2020/025340—ISA/EPO—dated Jul. 2, 2020.

(Continued)

*Primary Examiner* — Philip Sobutka
(74) *Attorney, Agent, or Firm* — Patterson & Sheridan, L.L.P

(57) ABSTRACT

Certain aspects of the present disclosure provide techniques for dynamically controlling uplink transmit power for multi-connectivity transmissions. An example method generally includes communicating with a first cell group and a second cell group in a multi-connectivity mode, determining whether to multiplex uplink control information (UCI) of a first transmission with a payload of a second transmission on a physical uplink shared channel (PUSCH) based at least in part on a reserved transmission power level associated with the first cell group, and transmitting, to the first cell group, at least one of the UCI or the payload based on the determination.

26 Claims, 5 Drawing Sheets

(56) References Cited

OTHER PUBLICATIONS

Sharp: "Channel Dropping and Conversion in UL Power Allocation for Dual Connectivity" 3GPP Draft, 3GPP TSG RAN WG1 Meeting #78, R1-143125, 3rd Generation Partnership Project (3GPP), Mobile Competence Centre, 650, Route Des Lucioles, F-06921, Sophia-Antipolis Cedex, France, vol. RAN WG1 No. Dresden, Germany; Aug. 18, 2014-Aug. 22, 2014, Aug. 10, 2014 (Aug. 10, 2014), XP050815518, 3 pages, Retrieved from the Internet: URL: http://www.3gpp.org/ftp/tsg_ran/WG1_RL1/TSGR1_78/Docs/ [retrieved on Aug. 10, 2014] section 2-3; p. 2-p. 3.

Sharp: "UL Channel Dropping and Conversion for UCI Transmissions in Dual Connectivity," 3GPP Draft, 3GPP TSG RAN WG1 Meeting #78bis, R1-143942, 3rd Generation Partnership Project (3GPP), Mobile Competence Centre, 350, Route Des Lucioles, F-06921, Sophia-Antipolis Cedex, France, vol. RAN WG1. No. Ljubljana, Slovenia, Oct. 6, 2014-Oct. 10, 2014, Sep. 27, 2014 (Sep. 27, 2014), XP050869610, 5 pages, Retrieved from the Internet: URL http://www.3gpp.org/ftp/tsg_ran/WG1_RL1/TSGR1_78b/Docs/ [retrieved on Sep. 27, 2014] section 3, p. 2-p. 4.

\* cited by examiner

DYNAMIC UPLINK POWER CONTROL FOR MULTI-CONNECTIVITY TRANSMISSIONS BASED ON RESERVED POWER LEVEL ASSOCIATED WITH FIRST CELL GROUP

CROSS-REFERENCE TO RELATED APPLICATION

The present Application for Patent claims priority to U.S. Provisional Application No. 62/826,784, filed Mar. 29, 2019, which is assigned to the assignee of the present application and hereby expressly incorporated by reference herein in its entirety.

BACKGROUND

Field of the Disclosure

Aspects of the present disclosure relate to wireless communications, and more particularly, to techniques for dynamically controlling uplink transmit power for multi-connectivity transmissions.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipment (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved dynamic uplink power control in multi-connectivity mode of a wireless network.

Certain aspects provide a method for wireless communication. The method generally includes communicating with a first cell group and a second cell group in a multi-connectivity mode, determining whether to multiplex uplink control information (UCI) of a first transmission with a payload of a second transmission on a physical uplink shared channel (PUSCH) based at least in part on a reserved transmission power level associated with the first cell group, and transmitting, to the first cell group, at least one of the UCI or the payload based on the determination.

The method may also include determining a transmission power level for a third transmission, comprising the UCI, on the PUSCH.

In certain aspects, the transmission power level may be greater than the reserved transmission power level. Transmitting may comprise transmitting the first transmission on a physical uplink control channel (PUCCH).

In certain aspects, the transmission power level may be less than or equal to the reserved transmission power level. Transmitting may comprise transmitting the third transmission.

Determining whether to multiplex the UCI on the PUSCH may comprise determining whether to multiplex the UCI on the PUSCH based on priority levels associated with the first transmission and the second transmission.

Determining whether to multiplex the UCI on the PUSCH may comprise determining that the first transmission has a higher priority level than the second transmission, and transmitting may include transmitting the first transmission on a PUCCH. The method may also include multiplexing a portion of the UCI on the PUSCH that provides the transmission power level that is less than or equal to the reserved transmission power level, and transmitting may include transmitting the third transmission. In certain aspects, transmitting may include transmitting the third transmission at a power level above the reserved transmission power level.

Determining whether to multiplex the UCI on the PUSCH may include determining that the first transmission and the second transmission have an enhanced priority level. In certain aspects, the first cell group is a secondary cell group and the second cell group is a master cell group. Transmitting may comprise transmitting the third transmission at a power level that is less than or equal to the reserved transmission power level. Transmitting may include transmitting the first transmission on a PUCCH. Transmitting may include transmitting the second transmission on the PUSCH.

The method may also include multiplexing the UCI on the PUSCH using a factor configured to protect the UCI during transmission in the multi-connectivity mode. Transmitting may comprise transmitting the third transmission on the PUSCH.

Transmitting may include transmitting, to the second cell group, another transmission concurrently with at least one of the UCI or the payload.

Certain aspects provide an apparatus for wireless communication. The apparatus generally includes a transceiver and a processing system. The transceiver is configured to communicate with a first cell group and a second cell group in a multi-connectivity mode. The processing system is configured to determine whether to multiplex uplink control information (UCI) of a first transmission with a payload of a second transmission on a physical uplink shared channel (PUSCH) based at least in part on a reserved transmission power level associated with the first cell group. The transceiver is further configured to transmit, to the first cell group, at least one of the UCI or the payload based on the determination.

The processing system may be configured to determine a transmission power level for a third transmission, comprising the UCI, on the PUSCH.

The transceiver may be configured to transmit the first transmission on a physical uplink control channel (PUCCH), if the transmission power level is greater than the reserved transmission power level; and the third transmission, if the transmission power level is less than or equal to the reserved transmission power level, the third transmission.

The processing system may be configured to determine whether to multiplex the UCI on the PUSCH based on priority levels associated with the first transmission and the second transmission. The processing system may be configured to determine that the first transmission has a higher priority level than the second transmission, and the transceiver may be configured to transmit the first transmission on a PUCCH, based on the determination of the priority level of the first transmission. The processing system may also be configured to determine that the second transmission has a higher priority level than the first transmission.

The transceiver is configured to multiplex, on the PUSCH, a portion of the UCI that provides the transmission power level that is less than or equal to the reserved transmission power level. The processing system may be configured to determine that the second transmission has a higher priority level than the first transmission. The transceiver may also be configured to transmit the third transmission.

The processing system may be configured to determine that the second transmission has a higher priority level than the first transmission, and the transceiver may be configured to transmit the third transmission at a power level above the reserved transmission power level.

The processing system may be configured to determine that the first transmission and the second transmission have an enhanced priority level.

In aspects, the first cell group is a secondary cell group and the second cell group is a master cell group. The processing system is configured to determine that the second transmission and the first transmission have an enhanced priority level or a same priority level associated with the secondary cell group. In aspects, the transceiver is configured to transmit, based on the determination that the second transmission and the first transmission have the enhanced priority level or the same priority level: the third transmission at a power level that is less than or equal to the reserved transmission power level, the first transmission on a PUCCH and drop the second transmission, or the second transmission on the PUSCH and drop the first transmission. In aspects, the transceiver is configured to: multiplex the UCI on the PUSCH using a factor configured to protect the UCI during transmission in the multi-connectivity mode, and transmit, based on the determination that the second transmission and the first transmission have the enhanced priority level or the same priority level, the third transmission on the PUSCH.

The transceiver may be configured to transmit, to the second cell group, a third transmission concurrently with at least one of the UCI or the payload.

Certain aspects provide an apparatus for wireless communication. The apparatus generally includes means for communicating with a first cell group and a second cell group in a multi-connectivity mode; means for determining whether to multiplex uplink control information (UCI) of a first transmission with a payload of a second transmission on a physical uplink shared channel (PUSCH) based at least in part on a reserved transmission power level associated with the first cell group; and means for transmitting, to the first cell group, at least one of the UCI or the payload based on the determination.

Certain aspects provide a computer readable medium. The computer readable medium has instruction thereon for communicating with a first cell group and a second cell group in a multi-connectivity mode; determining whether to multiplex uplink control information (UCI) of a first transmission with a payload of a second transmission on a physical uplink shared channel (PUSCH) based at least in part on a reserved transmission power level associated with the first cell group; and transmitting, to the first cell group, at least one of the UCI or the payload based on the determination.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
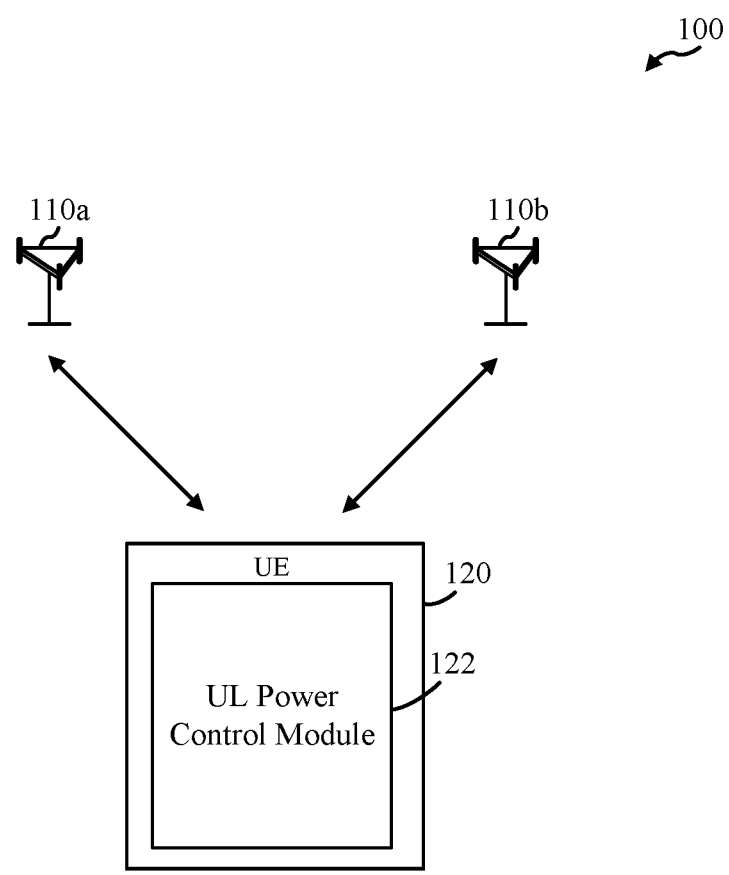
FIG. 1 is a block diagram conceptually illustrating an example telecommunications system, in accordance with certain aspects of the present disclosure.

Aspects of the present disclosure provide apparatus, methods, processing systems, and computer readable mediums for dynamically controlling uplink transmit power for multi-connectivity transmissions. For example, a user equipment may be communicating with a first cell group and a second cell group in a multi-connectivity mode. The power control decisions for one cell group may be a function of the dynamic scheduling made in the other cell group. To reduce uplink transmit power conflicts between cell groups in multi-connectivity applications, a minimum transmit power may be reserved for one or both of the cell groups. In certain cases, the reserved transmit power for a cell group may not be enough for an uplink transmission, for example, when the user equipment is triggered to multiplex uplink control information (UCI) on a data channel (such as the physical uplink shared channel). As further described herein, the user equipment may take various measures to transmit the UCI to the target cell group to reduce uplink transmit power conflicts with the other cell group and/or account for priority levels for certain services, such as low latency communications.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

New Radio (NR) is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communication Network

FIG. 1 illustrates an example wireless communication network 100 in which aspects of the present disclosure may be performed. The wireless communication network 100 may be an NR system (e.g., a 5G NR network). Certain aspects of the present disclosure relate to performing dynamic power control on multi-connectivity transmissions. For example, as shown in FIG. 1, the UE 120 may be communicating with multiple bases stations 110*a* and 110*b* in a multi-connectivity mode (e.g., NR-NR Dual Connectivity (NR-DC)). The UE 120 may have an uplink (UL) power control module 122 that may be configured for determining whether to multiplex UCI on a PUSCH based at least in part on a reserved transmission power level associated one of the cell groups in the NR-DC, according to aspects further described herein, for example, with respect to FIGS. 3 and 4.

NR-DC may generally refer to when a UE is connected to one gNB (e.g., BS 110*a*) that acts as a master node (MN) and another gNB (e.g., BS 110*b*) that acts as a secondary node (SN). The master gNB may be connected to a 5G Core Network (5GC) via a backhaul interface and to the secondary gNB via a wired or wireless backhaul interface. The secondary gNB might also be connected to the 5GC. In addition, NR-DC may also be used when a UE is connected to two gNB-DUs, one serving the master cell group (MGC) and the other serving the secondary cell group (SCG), connected to the same gNB-CU, acting both as a MN and as a SN.

As illustrated in FIG. 1, the wireless communication network 100 may include a number of base stations (BSs) 110*a* and 110*b* and other network entities. A BS may be a station that communicates with user equipment (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. In some examples, a cell may not necessarily be stationary, and the geographic area of the cell may move according to the location of a mobile BS. In some examples, the BSs may be interconnected to one another and/or to one or more other BSs or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

NR may utilize OFDM with a CP on the uplink and downlink and include support for half-duplex operation using TDD. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 2:
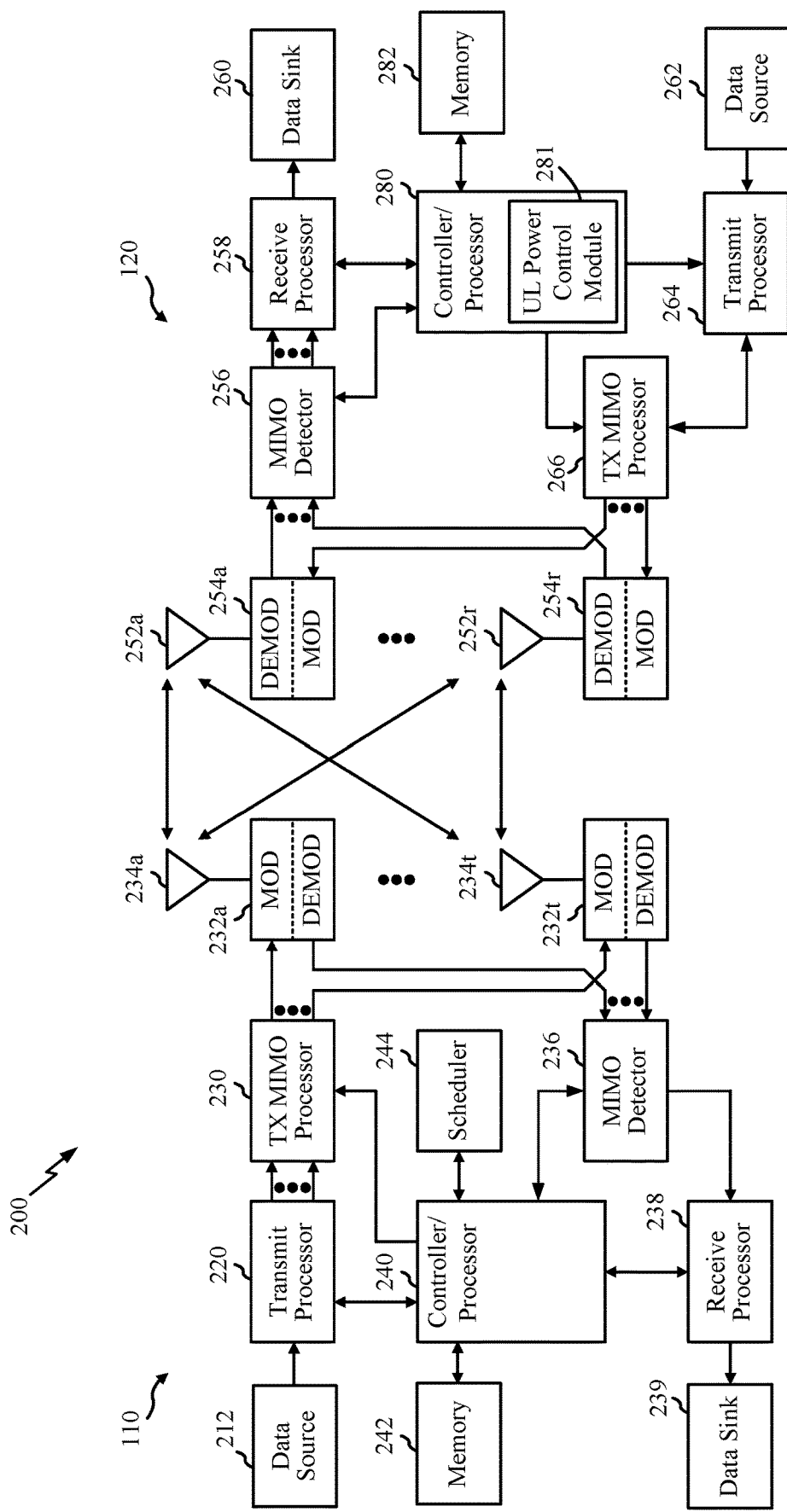
FIG. 2 is a block diagram conceptually illustrating a design of an example base station and user equipment, in accordance with certain aspects of the present disclosure.
Figure 4:
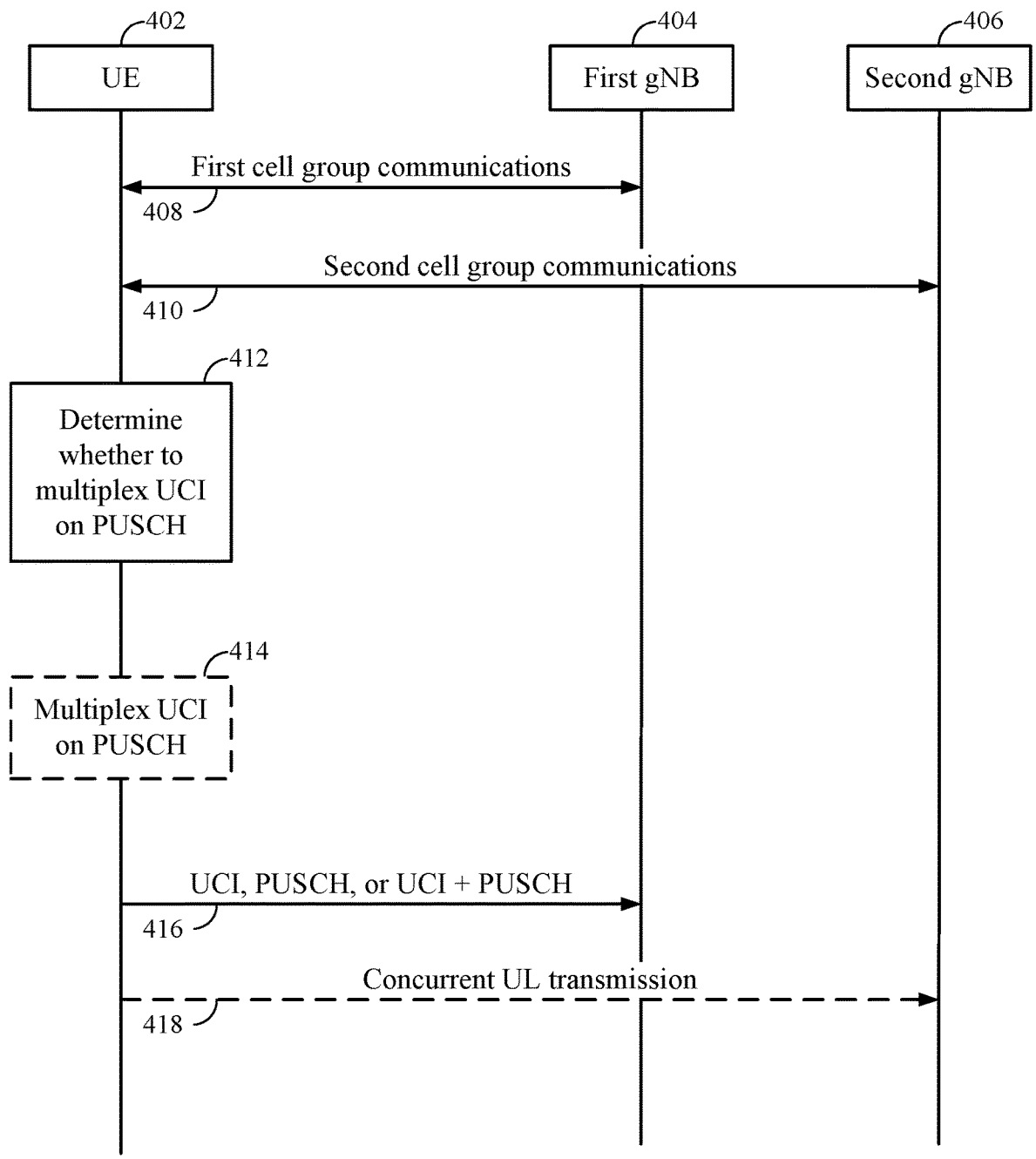
FIG. 4 is an example call flow diagram illustrating a user equipment performing dynamic uplink power control for multi-connectivity transmissions, in accordance with certain aspects of the present disclosure.

FIG. 2 illustrates example components of BS 110 and UE 120 (e.g., in the wireless communication network 100 of FIG. 1), which may be used to implement aspects of the present disclosure. For example, antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein for dynamically controlling uplink transmit power in multi-connectivity mode. For example, as shown in FIG. 4, the controller/processor 280 of the UE 120 has an UL power control module 281 that may be configured for determining whether to multiplex UCI on a PUSCH based at least in part on a reserved transmission power level associated with a cell group, according to aspects described herein.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH)) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The controller/processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink.

Example Dynamic Uplink Power Control for Multi-Connectivity Transmissions

For NR-DC, the UE may use uplink power control schemes such as semi-static power control or dynamic power control. In certain aspects, the UE may perform the semi-static or dynamic uplink power control schemes when the UE is using NR radio access in the same frequency range (e.g., Frequency Range 1 (FR1) including sub-6 GHz frequency bands or Frequency Range 2 (FR2) including frequency bands from 24 GHz to 30 GHz) for both cell groups.

Under the semi-static power control, the power control decisions in one cell group are not affected by the "dynamic scheduling" in the other cell group. For example, the total power is semi-statically split between the two cell groups such that that the UE is not expected to violate the total power constraints due to the concurrent transmissions in the two cell groups.

Under dynamic power control, the power control decisions in one cell group may be a function of the dynamic scheduling made in the other cell group. Due to concurrent transmissions, the uplink power requested by both of the cell groups may exceed the maximum allowed power. The UE may perform power rescaling to reduce the uplink transmit power for transmissions to the cell groups. Further, the transmission power per cell group may be dependent on whether any overlapping uplink is scheduled on a component carrier of the other cell group or not.

In NR-DC, unlike in carrier aggregation applications, the uplink transmit power on the component carriers may not be coordinated across the gNBs. For instance, with no dynamic coordination across the gNBs, the gNBs may not be aware of each others uplink transmit power decisions. Hence, when one gNB in a cell group schedules an uplink transmission (e.g., PUCCH or PUSCH transmissions) and requests for a specific power level, the UE may not be able to follow the commands due to overlapping, concurrent, transmissions to the other cell group.

To reduce uplink transmit power conflicts between cell groups in NR-DC applications, a minimum transmit power may be reserved for one or both of the cell groups with respect to certain transmissions, such as uplink control information. The minimum transmit power assigned to UEs in NR-DC mode may be generally referred to as a reserved transmission power level. The reserved transmission power level may be set to a certain level that allows the UE to send at least important signals such as control information including a PUCCH carrying a hybrid-automatic repeat request acknowledgement (HARQ-ACK) feedback without any interruption. For instance, the reserved transmission power level may be set to a power level that allows the UE to send a UCI transmission on a PUCCH to the corresponding cell group. In certain aspects, the reserved transmission power level may not be enough for an uplink transmission when the UE is triggered to multiplex the UCI on the PUSCH to make efficient use of uplink resources, such as when the UCI and PUSCH transmissions coincide in time. In certain aspects, the UCI and PUSCH transmissions may coincide in time either due transmission of an uplink shared channel (UL-SCH) transport block or due to triggering of an aperiodic-channel state information (CSI) transmission without an UL-SCH transport block. The UCI may include CSI, HARQ-ACK feedback, or a scheduling request.

When there is an ongoing transmission on one cell group, there may not be enough power to transmit the multiplexed UCI on the PUSCH to the other cell group. For instance, the target cell group of the ongoing transmission may be aware of the reserved transmission power level and request an uplink transmit power that uses the remaining power except for the reserved power level, and the reserved power level may be below what is sufficient to send the UCI multiplexed on the PUSCH to the other cell group.

A transmission having the UCI multiplexed on the PUSCH with insufficient power may also impact the UCI being received or decoded at the corresponding cell group. In certain aspects, transmitting the UCI multiplexed on the PUSCH at an insufficient power level may impact reception of HARQ-ACK messages at the corresponding cell group, and in turn, impact the downlink performance, for example, due to excessive retransmissions triggered by low power HARQ-ACK messages.

In other aspects, sending the UCI multiplexed on the PUSCH with a higher power than the reserved transmission power level may also increase the risk of experiencing phase discontinuity, even in cases, when there is no overlapping uplink transmission detected on the other cell group.

Certain aspects of the present disclosure relate to dynamic uplink power control for multi-connectivity transmissions such as NR-DC transmissions. For example, the UE may determine whether to multiplex the UCI on a PUSCH based at least in part on a reserved transmission power level associated with one of the cell groups of the NR-DC. In other aspects, the UE may determine whether to multiplex the UCI on the PUSCH based on priority levels associated with the UCI transmission and PUSCH transmission. A transmission having the UCI multiplexed on the PUSCH may be generally referred to as a UCI-PUSCH transmission. The UCI may be multiplexed with or without a data payload on the PUSCH.

Figure 3:
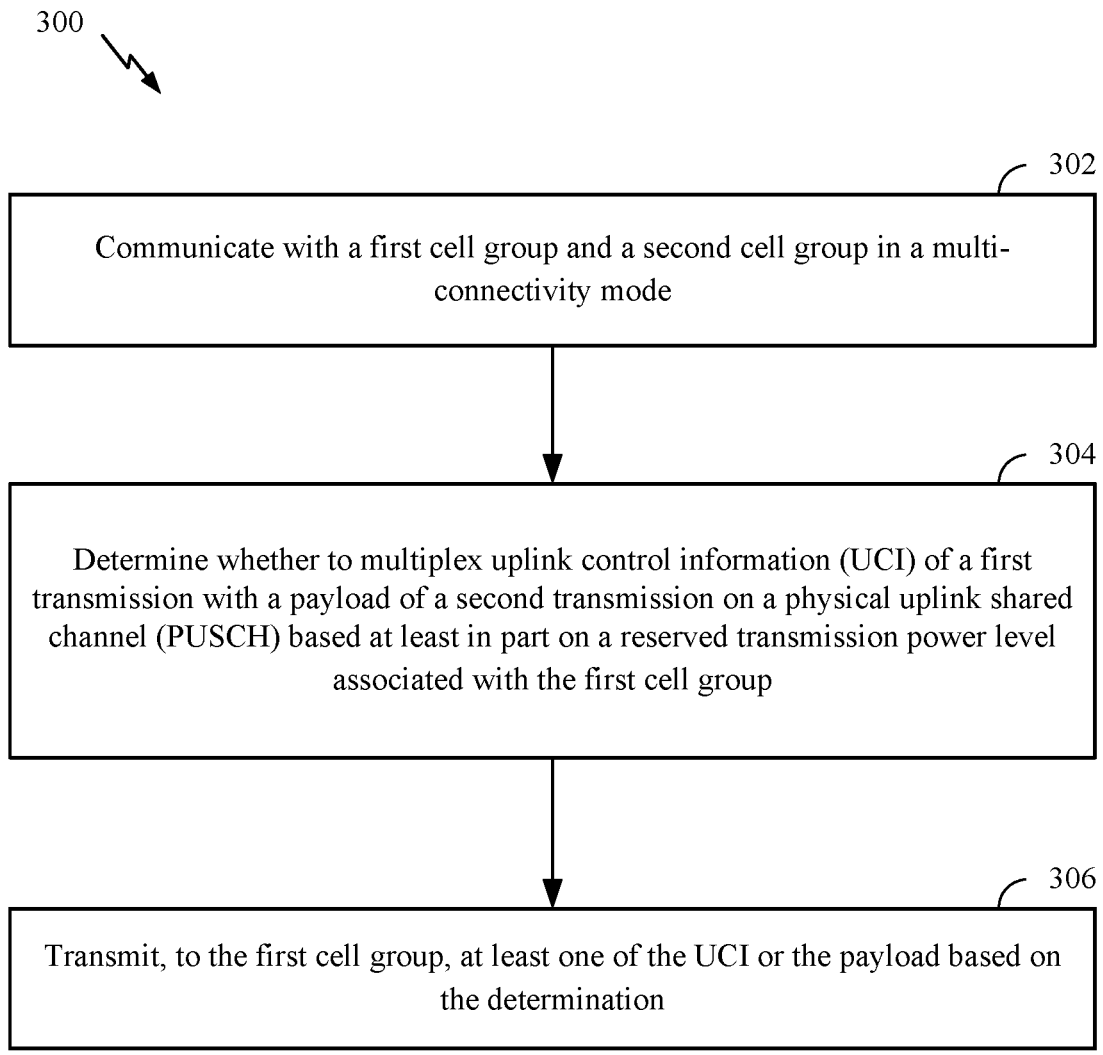
FIG. 3 is a flow diagram illustrating example operations for wireless communication by a user equipment, in accordance with certain aspects of the present disclosure.

FIG. 3 is a flow diagram illustrating example operations 300 for wireless communication, in accordance with certain aspects of the present disclosure. The operations 300 may be performed, for example, by UE (e.g., such as a UE 120 in the wireless communication network 100). Operations 300 may be implemented as software components that are executed and run on one or more processors (e.g., controller/processor 280 of FIG. 2). Further, the transmission and reception of signals by the UE in operations 300 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 300 may begin, at 302, where the UE may communicate with a first cell group and a second cell group in a multi-connectivity mode. At 304, the UE may determine whether to multiplex UCI of a first transmission with a payload of a second transmission on a PUSCH based at least in part on a reserved transmission power level associated with the first cell group. At 306, the UE may transmit, to the first cell group, at least one of the UCI or the payload based on the determination.

In certain aspects, the UE may determine a transmission power level for a third transmission, comprising the UCI or a combination of the UCI and the payload, on the PUSCH. The transmission power level for the UCI-PUSCH may be generally referred to as the sufficient transmission power level. The sufficient transmission power level may include the transmit power needed to send the UCI-PUSCH transmission to the target cell group.

In certain aspects, the decision whether to multiplex the UCI on the PUSCH may be determined based at least in part on a transmission power level, including the reserved transmission power level, the sufficient transmission power level, an available transmission power level, or a combination thereof. The available transmission power level may include the remaining transmit power available to the UE taking into account other concurrent transmissions, such as transmissions to another cell group and/or component carriers. The sufficient transmission power level may exceed the reserved transmission power level and/or the available transmission power level.

In certain aspects, the UE may determine that the reserved transmission power level and/or the available transmission power level is sufficient to send the UCI-PUSCH transmission. Based on the determination, the UE may piggyback the UCI on the PUSCH. For example, when the sufficient transmission power level for the UCI-PUSCH transmission is less than or equal to the reserved transmission power level and/or the available transmission power level, the UE may determine, at 304, to multiplex the UCI on the PUSCH. The UE may multiplex the UCI on the PUSCH and transmit, at 306, the UCI-PUSCH transmission (such as the third transmission previously discussed).

In other aspects, the UE may determine that the reserved transmission power level and/or the available transmission power is not sufficient for the UCI-PUSCH transmission. Based on the determination, the UE may drop the PUSCH, in accordance with the assumption that the reserved transmission power level is sufficient for the UCI, and transmit the UCI on the PUCCH. For example, when the sufficient transmission power level for the UCI-PUSCH transmission is greater than the reserved transmission power level and/or the available transmission power level, the UE may determine, at 304, not to multiplex the UCI on the PUSCH and transmit, at 306, the first transmission on the PUCCH with respect to operations 300. In certain aspects, when the sufficient transmission power level for the UCI-PUSCH transmission is greater than the reserved transmission power level and/or the available transmission power level, the UE may determine, at 304, to multiplex the UCI on the PUSCH. For example, the UE may multiplex a portion of the UCI (e.g., all or some of the HARQ-ACK bits) or bundle UCI bits on the PUSCH that provides a sufficient transmission power level for the UCI-PUSCH transmission that is less than or equal to the reserved transmission power level and/or the available transmission power level.

In certain aspects, the UE may determine whether to multiplex the UCI on the PUSCH based on priority levels associated with the UCI transmission and PUSCH transmission. For example, determining whether to multiplex the UCI on the PUSCH at 304 may include determining whether to multiplex the UCI on the PUSCH based on priority levels associated with the first transmission and the second transmission with respect to operations 300.

In certain wireless communication networks, such as NR, the UE may be assigned different priority levels for transmissions, including, for example URLLC, eMBB, and/or MTC (e.g., URLLC>eMBB>MTC). The UE may determine priority levels associated with the UCI and PUSCH transmissions, respectively, based on various indications corresponding to the priority such as a downlink control information (DCI) format granting the PUSCH, a bit field in the DCI, a radio network temporary identifier (RNTI) of the DCI, a sounding reference signal resource indicator (SRI), a power control loop index indicated by the SRI, or the like. In certain aspects, URLLC services may take priority over eMBB services. The URLLC transmissions may have an enhanced priority level or a higher priority level than eMBB transmissions. An enhanced priority level may refer to a topmost priority level or a priority level that is higher than another priority level.

In certain aspects, determining whether to multiplex the UCI on the PUSCH may be based on the UCI transmission having a higher priority level than the PUSCH transmission. With respect to operations 300, determining whether to multiplex the UCI on the PUSCH at 304 may include determining that the first transmission has a higher priority level than the second transmission. Suppose, for example, that the first transmission (e.g., the UCI transmission corresponds to an URLLC service) has a higher priority level than the second transmission (e.g., the PUSCH transmission corresponds to an eMBB service) with respect to operations 300. The UE may determine, at 304, not to multiplex the UCI on the PUSCH based on the first transmission having a higher priority than the second transmission and transmit the first transmission on the PUCCH at 306.

In certain aspects, determining whether to multiplex the UCI on the PUSCH may be based on the PUSCH transmission having a higher priority level than the UCI transmission. For instance, when the PUSCH transmission has a higher priority level than the UCI transmission, the UE may determine whether to multiplex the UCI on the PUSCH according to the transmission power rules previously described or independent of the transmission power rules.

With respect to operations 300, determining whether to multiplex the UCI on the PUSCH may include determining that the second transmission has a higher priority level than the first transmission. Suppose, for example, that the second transmission (e.g., the PUSCH transmission corresponds to an URLLC service) has a higher priority level than the first transmission (e.g., the UCI transmission corresponds to an eMMB service) with respect to the operations 300. The UE may determine, at 304, in accordance with the assumption that the URLLC PUSCH will protect the UCI, to multiplex the UCI on the PUSCH, if there is sufficient power, and transmit the third transmission on the PUSCH.

In certain aspects, the UE may multiplex a portion of the UCI (e.g., HARQ-ACK bits) on the PUSCH that provides a sufficient transmission power level for the UCI-PUSCH transmission that is less than or equal to the reserved transmission power level and/or the available transmission power level. That is, the UE may adjust the amount of UCI multiplexed on the PUSCH to satisfy the reserved transmission power level constraint. The UE may adjust the amount of UCI based on the second transmission having a higher priority level than the first transmission with respect to operations 300.

In certain aspects, the power scaling rules may give URLLC with UCI higher priority in NR-DC applications. For instance, suppose the second transmission has a higher priority level than the first transmission, the UE may determine to multiplex the UCI on the URLLC PUSCH and transmit, at 306, the third transmission (the UCI-PUSCH transmission) at a power level above the reserved transmission power level. That is, the UE may reclaim uplink transmit power from the other cell group to transmit the UCI-PUSCH transmission if introducing a phase discontinuity is allowed.

In certain aspects, determining whether to multiplex the UCI on the PUSCH may be based on the UCI transmission and PUSCH transmission having an enhanced priority level (e.g., URLLC) or the same priority level. With respect to operations 300, determining whether to multiplex the UCI on the PUSCH, at 304, may include determining that the first transmission and the second transmission have an enhanced priority level or the same priority level. For instance, when the first transmission and the second transmission have an enhanced priority level or the same priority level, the UE may determine, at 304, to multiplex the UCI on the PUSCH. In other aspects, when the first transmission and the second transmission have an enhanced priority level or the same priority level, the UE may determine whether to multiplex the UCI on the PUSCH according to the transmission power rules previously described or independent of the transmission power rules.

In certain aspects, when the first transmission and the second transmission have an enhanced priority level (e.g., URLLC) on a secondary cell group, and there is a concurrent UCI-PUSCH transmission on a master cell group, the UE may scale down the UCI-PUSCH transmission on the secondary cell group in accordance with the assumption that transmission to the master cell group takes priority over transmission to the secondary cell group. For instance, the UE may transmit, at 306, the third transmission at a power level that is less than or equal to the reserved transmission power level. In other aspects, the UE may drop either the UCI transmission or the PUSCH transmission on the secondary cell group. For instance, the UE may transmit, at 306, the first transmission on a PUCCH or the second transmission on the PUSCH. In still other aspects, the UE may multiplex the UCI on the PUSCH using a factor configured to protect the UCI-PUSCH transmission to the secondary cell group. That is, the UE may use a separate beta factor while multiplexing the UCI on the PUSCH to better protect the UCI.

The UE may apply the priority level based rules described herein to the decision of whether to multiplex the UCI on the PUSCH independent of the transmission power level for the UCI-PUSCH transmission. For example, the UE may assume that an eMBB PUSCH does not offer enough protection for URLLC UCI and determine not multiplex the URLLC UCI on the eMBB PUSCH, even if there is sufficient power for the UCI-PUSCH transmission on the eMBB PUSCH.

FIG. 4 is a call flow diagram illustrating an example UE 402 performing dynamic uplink power control for multi-connectivity transmissions, in accordance with certain aspects of the present disclosure. As shown, at 408, the UE 402 may be communicating with a first cell group associated with the first gNB 404. At 410, in a multi-connectivity mode (e.g., NR-DC), the UE 402 may be communicating with a second cell group associated with the second gNB 406. At 412, the UE may determine whether to multiplex the UCI on the PUSCH according to the various scenarios and rules described herein with respect to operations 300. At 414, if the UE determines to multiplex the UCI on the PUSCH at 412, the UE may proceed with multiplexing the UCI on the PUSCH, for example, multiplexing at least portion of the UCI to satisfy the reserved transmission power constraint. At 416, the UE may transmit, to the first cell group associated with the first gNB 404, the UCI on the PUCCH, a data payload on the PUSCH, or the UCI-PUSCH transmission depending on the determination made at 412. At 418, the UE may also transmit, to the second cell group associated with the second gNB 406, another transmission concurrently with the transmission at 416.

Figure 5:
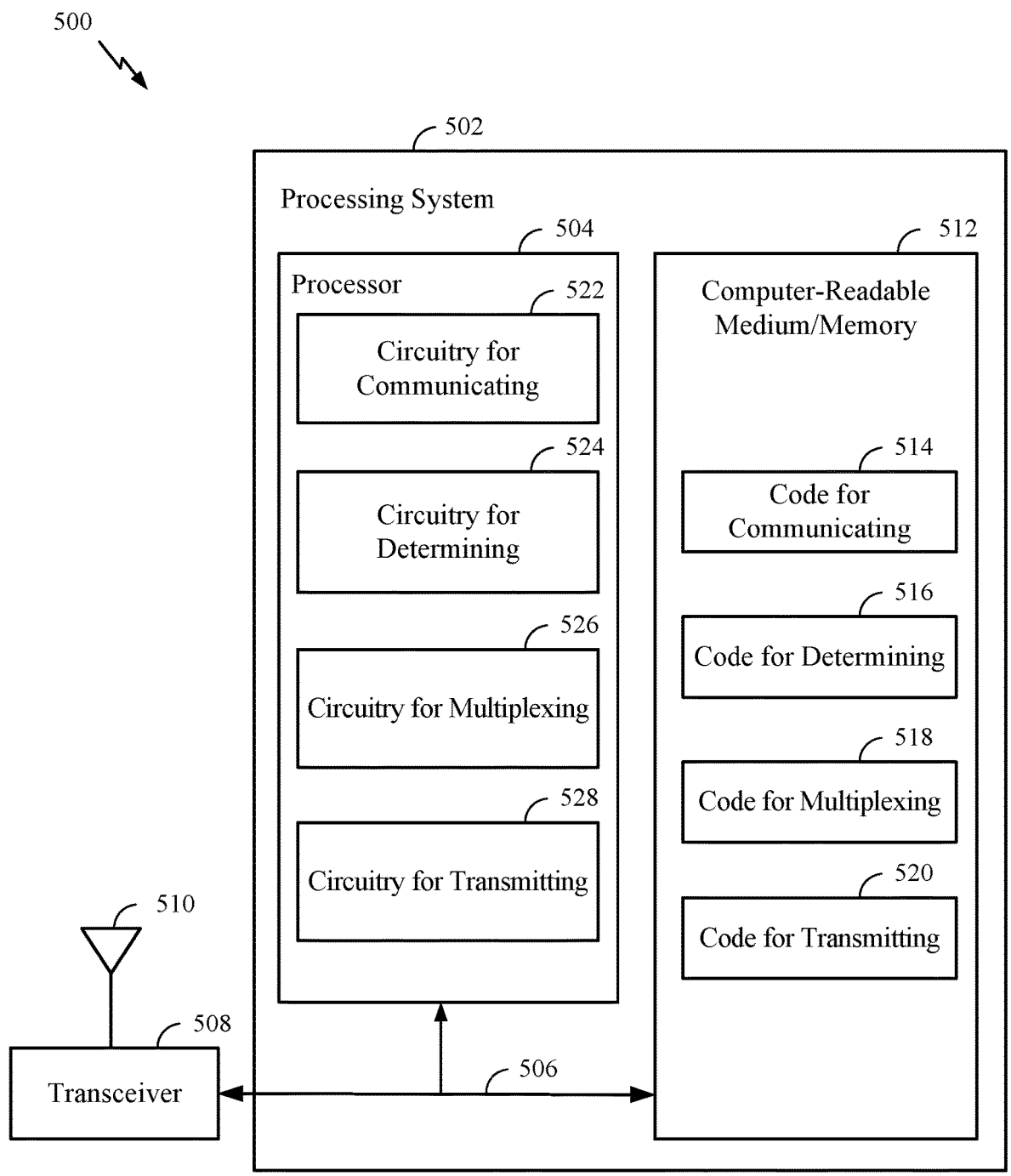
FIG. 5 illustrates a communications device that may include various components configured to perform operations for the techniques disclosed herein in accordance with aspects of the present disclosure.

FIG. 5 illustrates a communications device 500 (e.g., UE 120) that may include various components (e.g., corresponding to means-plus-function components) configured to perform operations for the techniques disclosed herein, such as the operations illustrated in FIGS. 3 and 4. The communications device 500 includes a processing system 502 coupled to a transceiver 508. The transceiver 508 is configured to transmit and receive signals for the communications device 500 via an antenna 510, such as the various signals as described herein. The processing system 502 may be configured to perform processing functions for the communications device 500, including processing signals received and/or to be transmitted by the communications device 500.

The processing system 502 includes a processor 504 coupled to a computer-readable medium/memory 512 via a bus 506. In certain aspects, the computer-readable medium/memory 512 is configured to store instructions (e.g., computer-executable code) that when executed by the processor 504, cause the processor 504 to perform the operations illustrated in FIGS. 3 and 4, or other operations for performing the various techniques discussed herein. In certain aspects, computer-readable medium/memory 512 stores code for communicating 514, code for determining 516, code for multiplexing 518, and/or code for transmitting 520. In certain aspects, the processor 504 has circuitry configured to implement the code stored in the computer-readable medium/memory 512. The processor 504 includes circuitry for communicating 522, circuitry for determining 524, circuitry for multiplexing 526, and/or circuitry for transmitting 528.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. A BS may support one or multiple (e.g., three) cells.

A network controller may couple to a set of BSs and provide coordination and control for these BSs. The network controller may communicate with the BSs via a backhaul. The BSs may also communicate with one another (e.g., directly or indirectly) via wireless or wireline backhaul.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 3 and 4.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communication by a user equipment (UE), comprising:
    communicating with a first cell group and a second cell group in a multi-connectivity mode;
    determining whether to multiplex uplink control information (UCI) of a first transmission with a payload of a second transmission on a physical uplink shared channel (PUSCH) based at least in part on a reserved transmission power level associated with the first cell group;
    determining a transmission power level for a third transmission, comprising the UCI, on the PUSCH; and
    transmitting, to the first cell group, at least one of the UCI or the payload based on the determination of whether to multiplex the UCI of the first transmission with the payload of the second transmission on the PUSCH.

2. The method of claim 1, wherein transmitting comprises transmitting:
    the first transmission on a physical uplink control channel (PUCCH), if the transmission power level is greater than the reserved transmission power level; and
    the third transmission, if the transmission power level is less than or equal to the reserved transmission power level.

3. The method of claim 1, further comprising:
    multiplexing, on the PUSCH, a portion of the UCI that provides the transmission power level that is less than or equal to the reserved transmission power level;
    wherein determining whether to multiplex the UCI on the PUSCH comprises determining that the second transmission has a higher priority level than the first transmission; and
    wherein transmitting comprises transmitting the third transmission.

4. The method of claim 1 wherein:
    determining whether to multiplex the UCI on the PUSCH comprises determining that the second transmission has a higher priority level than the first transmission; and
    transmitting comprises transmitting the third transmission at a power level above the reserved transmission power level.

5. The method of claim 1, wherein:
    the first cell group is a secondary cell group and the second cell group is a master cell group; and
    determining whether to multiplex the UCI on the PUSCH comprises determining that the second transmission and the first transmission have an enhanced priority level or a same priority level associated with the secondary cell group.

6. The method of claim 5, wherein transmitting comprises, based on the determination that the second transmission and the first transmission have the enhanced priority level or the same priority level:
    transmitting the third transmission at a power level that is less than or equal to the reserved transmission power level,
    transmitting the first transmission on a PUCCH and dropping the second transmission, or
    transmitting the second transmission on the PUSCH and dropping the first transmission.

7. The method of claim 5, further comprising:
    multiplexing the UCI on the PUSCH using a factor configured to protect the UCI during transmission in the multi-connectivity mode; and
    wherein transmitting comprises transmitting, based on the determination that the second transmission and the first transmission have the enhanced priority level or the same priority level, the third transmission on the PUSCH.

8. The method of claim 1, wherein transmitting comprises transmitting, to the second cell group, the third transmission concurrently with at least one of the UCI or the payload.

9. A method of wireless communication by a user equipment (UE), comprising:
    communicating with a first cell group and a second cell group in a multi-connectivity mode;
    determining whether to multiplex uplink control information (UCI) of a first transmission with a payload of a second transmission on a physical uplink shared channel (PUSCH) based at least in part on a reserved transmission power level associated with the first cell group, wherein determining whether to multiplex the UCI on the PUSCH comprises determining whether to multiplex the UCI on the PUSCH based on priority levels associated with the first transmission and the second transmission; and
    transmitting, to the first cell group, at least one of the UCI or the payload based on the determination.

10. The method of claim 9, wherein:
    determining whether to multiplex the UCI on the PUSCH comprises determining that the first transmission has a higher priority level than the second transmission; and
    transmitting comprises transmitting the first transmission on a PUCCH.

11. The method of claim 9, wherein determining whether to multiplex the UCI on the PUSCH comprises determining that the second transmission has a higher priority level than the first transmission.

12. The method of claim 9, wherein determining whether to multiplex the UCI on the PUSCH comprises determining that the first transmission and the second transmission have an enhanced priority level.

13. An apparatus for wireless communication, comprising:
a transceiver configured to communicate with a first cell group and a second cell group in a multi-connectivity mode;
a processing system configured to:
determine whether to multiplex uplink control information (UCI) of a first transmission with a payload of a second transmission on a physical uplink shared channel (PUSCH) based at least in part on a reserved transmission power level associated with the first cell group; and
determine a transmission power level for a third transmission, comprising the UCI, on the PUSCH; and
wherein the transceiver is further configured to transmit, to the first cell group, at least one of the UCI or the payload based on the determination of whether to multiplex the UCI of the first transmission with the payload of the second transmission on the PUSCH.

14. The apparatus of claim 13, wherein the transceiver is configured to transmit:
the first transmission on a physical uplink control channel (PUCCH), if the transmission power level is greater than the reserved transmission power level; and
the third transmission, if the transmission power level is less than or equal to the reserved transmission power level, the third transmission.

15. The apparatus of claim 13, wherein:
the transceiver is configured to multiplex, on the PUSCH, a portion of the UCI that provides the transmission power level that is less than or equal to the reserved transmission power level;
the processing system is configured to determine that the second transmission has a higher priority level than the first transmission; and
the transceiver is configured to transmit the third transmission.

16. The apparatus of claim 13, wherein:
the processing system is configured to determine that the second transmission has a higher priority level than the first transmission; and
the transceiver is configured to transmit the third transmission at a power level above the reserved transmission power level.

17. The apparatus of claim 13, wherein:
the first cell group is a secondary cell group and the second cell group is a master cell group; and
the processing system is configured to determine that the second transmission and the first transmission have an enhanced priority level or a same priority level associated with the secondary cell group.

18. The apparatus of claim 17, wherein the transceiver is configured to transmit, based on the determination that the second transmission and the first transmission have the enhanced priority level or the same priority level:
the third transmission at a power level that is less than or equal to the reserved transmission power level,
the first transmission on a PUCCH and drop the second transmission, or
the second transmission on the PUSCH and drop the first transmission.

19. The apparatus of claim 17, wherein: the transceiver is configured to:
multiplex the UCI on the PUSCH using a factor configured to protect the UCI during transmission in the multi-connectivity mode, and
transmit, based on the determination that the second transmission and the first transmission have the enhanced priority level or the same priority level, the third transmission on the PUSCH.

20. The apparatus of claim 13, wherein the transceiver is configured to transmit, to the second cell group, a third transmission concurrently with at least one of the UCI or the payload.

21. An apparatus for wireless communication, comprising:
a transceiver configured to communicate with a first cell group and a second cell group in a multi-connectivity mode;
a processing system configured to determine whether to multiplex uplink control information (UCI) of a first transmission with a payload of a second transmission on a physical uplink shared channel (PUSCH) based at least in part on a reserved transmission power level associated with the first cell group, wherein the processing system is configured to determine whether to multiplex the UCI on the PUSCH based on priority levels associated with the first transmission and the second transmission; and
wherein the transceiver is further configured to transmit, to the first cell group, at least one of the UCI or the payload based on the determination.

22. The apparatus of claim 21, wherein:
the processing system is configured to determine that the first transmission has a higher priority level than the second transmission; and
the transceiver is configured to transmit the first transmission on a PUCCH, based on the determination of the priority level of the first transmission.

23. The apparatus of claim 21, wherein the processing system is configured to determine that the second transmission has a higher priority level than the first transmission.

24. The apparatus of claim 21, wherein the processing system is configured to determine that the first transmission and the second transmission have an enhanced priority level.

25. An apparatus for wireless communication, comprising:
means for communicating with a first cell group and a second cell group in a multi-connectivity mode;
means for determining whether to multiplex uplink control information (UCI) of a first transmission with a payload of a second transmission on a physical uplink shared channel (PUSCH) based at least in part on a reserved transmission power level associated with the first cell group;
means for determining a transmission power level for a third transmission, comprising the UCI, on the PUSCH; and
means for transmitting, to the first cell group, at least one of the UCI or the payload based on the determination of whether to multiplex the UCI of the first transmission with the payload of the second transmission on the PUSCH.

26. A non-transitory computer readable medium having instructions stored thereon for:
communicating with a first cell group and a second cell group in a multi-connectivity mode;
determining whether to multiplex uplink control information (UCI) of a first transmission with a payload of a second transmission on a physical uplink shared channel (PUSCH) based at least in part on a reserved transmission power level associated with the first cell group;

determining a transmission power level for a third transmission, comprising the UCI, on the PUSCH; and transmitting, to the first cell group, at least one of the UCI or the payload based on the determination of whether to multiplex the UCI for the first transmission with the payload of the second transmission on the PUSCH.

* * * * *